US00RE40621E

(19) United States
(12) Reissued Patent
Choi

(10) Patent Number: US RE40,621 E
(45) **Date of Reissued Patent: *Jan. 13, 2009**

(54) FLOW IMPROVEMENT VANES IN THE INTAKE SYSTEM OF AN INTERNAL COMBUSTION ENGINE

(75) Inventor: Michael Choi, Garden City, MI (US)

(73) Assignee: Ford Global Technologies, LLC, Dearborn, MI (US)

( * ) Notice: This patent is subject to a terminal disclaimer.

(21) Appl. No.: 09/909,430

(22) Filed: Jul. 19, 2001

Related U.S. Patent Documents

Reissue of:
(64) Patent No.: 5,924,398
Issued: Jul. 20, 1999
Appl. No.: 08/944,578
Filed: Oct. 6, 1997

(51) Int. Cl.
*F02M 29/00* (2006.01)

(52) U.S. Cl. ..... 123/590; 123/184.53
(58) Field of Classification Search ..... 123/184.53, 123/590, 592, 593, 337, 300, 568.17
See application file for complete search history.

(56) References Cited

U.S. PATENT DOCUMENTS

| | | | | |
|---|---|---|---|---|
| 1,131,371 A | * | 3/1915 | Hatfield et al. | 48/189.4 |
| 1,333,856 A | * | 3/1920 | Loeffelholz | 123/568.17 |
| 2,430,841 A | | 11/1947 | Wulfhorst | |
| 2,639,230 A | | 5/1953 | Lefebre | |
| 2,704,504 A | | 3/1955 | Wilkening | |

(Continued)

FOREIGN PATENT DOCUMENTS

| | | | |
|---|---|---|---|
| BE | 901 035 A | | 3/1985 |
| CA | 971446 | | 7/1975 |
| DE | 23 04 793 A | | 8/1974 |
| DE | 26 50 364 A1 | | 5/1978 |
| DE | 28 36 042 A1 | | 2/1980 |
| DE | 36 17 759 A1 | | 12/1986 |
| DE | 41 13 248 A1 | | 10/1992 |
| FR | 1 213 642 | | 4/1960 |
| FR | 2257793 | | 9/1975 |
| FR | 2 602 277 A | | 2/1988 |
| FR | 2 692 021 A1 | | 12/1993 |
| JP | 60104709 | | 6/1985 |
| JP | 63-306268 A1 | | 12/1988 |
| JP | 04066775 | | 3/1992 |
| JP | 20814 | * | 1/2001 |

OTHER PUBLICATIONS

Kunststofftechnik, "Plastics in Automotive Engineering—Cars and Plastics—A Vital Partnership", © VDI–Verlag GmbH, Düsseldorf 1993, The VDI–Society for Plastic Technology. See for example, p. 23 and the corresponding figures, including Fig. 44.

Communication pursuant to Article 96(2) EPC, Appln. No. 98 308 724.8–2311, Applicant: Ford Global Technologies, Inc.

*Primary Examiner*—Hai H Huynh
(74) *Attorney, Agent, or Firm*—Allan J. Lippa; Alleman Hall McCoy Russell & Tuttle, LLP

(57) ABSTRACT

An air diffuser (20) for an air intake system of an internal combustion engine. The air intake system includes a throttle body (22) up stream from an intake manifold (24), with the air diffuser (20) mounted between them. The air diffuser (20) includes vanes (62,64) extending into its main bore (52) in order to diffuse and redirect the air flowing from the throttle body (22) into the intake manifold (24). An EGR assembly (70) is mounted to the manifold (24) just downstream of the inlet to the manifold (24). The diffusion and redirection of the air reduces the noise emanating from the intake manifold (24) for particular engine operating conditions, and also reduces the backflow of EGR gasses into the throttle body (22).

73 Claims, 3 Drawing Sheets

U.S. PATENT DOCUMENTS 3,177,972 A * 4/1965 Wirt ..... 181/268
3,238,955 A * 3/1966 Lassiter ..... 137/1
3,298,677 A 1/1967 Anderson ..... 261/62
3,458,297 A 7/1969 Anderson
3,810,526 A 5/1974 Kawasaki
3,814,391 A * 6/1974 Cedarholm ..... 261/50.1
3,826,235 A * 7/1974 Pasbrig ..... 123/590
3,835,956 A 9/1974 Kishira
3,861,376 A * 1/1975 Ashley ..... 123/657
3,960,177 A * 6/1976 Baumann ..... 137/625.31
3,965,873 A 6/1976 Konomi et al.
3,966,014 A 6/1976 Gowing
4,094,290 A 6/1978 Dismuke
4,274,386 A 6/1981 Reyes
4,307,697 A * 12/1981 Ong ..... 123/590
4,318,386 A * 3/1982 Showalter et al. ..... 123/188.14
4,333,441 A 6/1982 Still et al.
4,362,223 A * 12/1982 Meier ..... 181/206
4,384,563 A * 5/1983 Siefer et al. ..... 123/549
4,438,049 A 3/1984 Ammons
4,463,742 A 8/1984 Williams
4,492,212 A 1/1985 Dooley
4,672,940 A 6/1987 Nakayama et al.
4,691,894 A * 9/1987 Pyotsia et al. ..... 251/127
4,741,295 A 5/1988 Hosoya et al.
4,770,151 A 9/1988 Finlay
4,867,109 A 9/1989 Tezuka et al.
4,966,122 A 10/1990 Frinzel
5,042,448 A 8/1991 Cook et al.
5,097,656 A 3/1992 Napier
5,107,800 A 4/1992 Araki et al.
5,113,838 A 5/1992 Kim
5,341,773 A * 8/1994 Schulte et al. ..... 123/184.61
5,429,102 A * 7/1995 Edwards et al. ..... 123/593
5,480,123 A * 1/1996 Bey ..... 251/305
5,501,192 A 3/1996 Cutler
5,551,392 A * 9/1996 Yamaji et al. ..... 123/306
5,572,979 A * 11/1996 Czadzeck ..... 123/568.17
5,632,145 A * 5/1997 Hunt ..... 123/184.21
5,666,930 A * 9/1997 Elder ..... 123/41.31
5,709,529 A * 1/1998 Parzych ..... 415/119
5,712,786 A 1/1998 Ueda
5,722,357 A 3/1998 Choi
5,749,342 A * 5/1998 Chao ..... 123/184.56
5,758,614 A 6/1998 Choi
5,769,045 A * 6/1998 Edwards et al. ..... 123/184.61
5,794,591 A * 8/1998 Kalebjian et al. ..... 123/337
5,809,961 A * 9/1998 Morota et al. ..... 123/184.53
5,937,838 A * 8/1999 Harrell ..... 123/593
5,970,963 A * 10/1999 Nakase et al. ..... 123/184.21
6,170,460 B1 * 1/2001 Buswell et al. ..... 123/306
6,367,772 B1 * 4/2002 Glogovcsan, Jr. ..... 251/305
6,439,540 B1 * 8/2002 Tse ..... 251/127
6,758,461 B1 * 7/2004 Omarsson ..... 261/50.1
6,824,119 B2 * 11/2004 Conley et al. ..... 251/305
7,086,498 B2 * 8/2006 Choi et al. ..... 181/270
7,131,514 B2 * 11/2006 Choi et al. ..... 181/270

* cited by examiner

FLOW IMPROVEMENT VANES IN THE INTAKE SYSTEM OF AN INTERNAL COMBUSTION ENGINE

Matter enclosed in heavy brackets [ ] appears in the original patent but forms no part of this reissue specification; matter printed in italics indicates the additions made by reissue.

This application is related to co-pending application Ser. Nos. 08/847,083 and 08/847,084 filed May 1, 1997.

FIELD OF THE INVENTION

The present invention relates to an air intake system for an internal combustion engine and more particularly to improved flow control including noise suppression and anti-sludging within the air intake system for an engine in a vehicle.

BACKGROUND OF THE INVENTION

Current internal combustion engines employed to power vehicles generally operate with air intake systems that include a throttle body and intake manifold assembly to control and direct the air flow into the engine. Intake air flow control is important not only for the obvious power output of the combustion chambers in the engine, but also for such things as minimizing noise emanating due to the air flow control system and also adequate long term operation of the system without undesirable concerns arising.

As for noise generation, this portion of the air intake system has generally been made of metal. However, in today's vehicles, an emphasis is placed on fuel economy and exhaust emissions reductions. This has lead to the desire to form the intake manifold and possibly even the throttle body out of plastic types of materials. Plastic [arts] *parts* can be formed which are lighter in weight and can be formed into more complex shapes than equivalent metal parts, allowing for improved air flow and thus improving both fuel economy and engine performance.

Although these improvements are welcome, nonetheless, there are other characteristics of plastics that are less desirable than equivalent metal components. For example, plastic is less dense than metal, which allows for more transmission of sound through it. Consequently, sound generated within the intake manifold, for instance, will more readily pass through into the engine compartment. This sound, then, can radiate to a driver of a vehicle, who may object to it. This is particularly true since, in general, engines are being designed overall to operate more quietly, making any stray noise more noticeable.

One noise generated within the intake manifold of an engine is a whooshing noise generated by the air flow pattern created as the air flows past a butterfly or other throttle valve in the throttle body. This is particularly true for engine conditions such as tip-in or fast opening of the throttle valve. With previous engines, either due to the other background noises produced which drowned out this whooshing noise or because the intake manifold was metal which substantially dampened the noise, vehicle drivers would not hear it. Now with quieter engines and plastic manifolds, it is noticeable and objectionable to some drivers.

Another concern with the intake air flow control system is that over the long term, build up of sludge can occur around the throttle value, thus interfering with the smooth operation of this valve. One source for the contaminants causing the sludge is an exhaust gas recirculation (EGR) valve that feeds into the intake manifold just downstream of the throttle body. Due to packaging or flow reasons, it is sometimes desirable to locate the EGR valve immediately downstream of the throttle body. However, for theses designs, the EGR gasses can end up circulating back toward the downstream side of the throttle valve before flowing downstream through the intake manifold. This allows for contaminates in the EGR gasses to build up on the throttle valve as sludge over time. With a build up of sludge, the throttle valve does not move as freely and can encounter temporary sticking conditions requiring more force when a vehicle operator first presses on the accelerator pedal.

Thus, it is desirable to employ an air intake system for a vehicle engine in which the air flow is controlled such that noise generated by air flow through the throttle body and intake manifold is reduced, thus reducing the noise that a vehicle operator will hear, while also minimizing any back-flow of gasses from the intake manifold into the throttle body in order to minimize the chances for sludge build up on the throttle valve.

SUMMARY OF THE INVENTION

In its embodiments, the present invention contemplates an air intake system for controlling the flow of air into an internal combustion engine. The air intake system includes a throttle body including a first bore wall defining a first portion of a main bore and a valve mounted within the first portion of the main bore, with the valve being movable to selectively restrict the flow of air through the main bore. An intake manifold includes a second bore wall defining a second portion of the main bore, with the second bore wall having an upstream end. The manifold further includes means for mounting the throttle body relative to the intake manifold such that the first and the second portions of the main bore align with one another, with the intake manifold being downstream of the throttle body, and with the manifold including an EGR inlet adjacent the upstream end of the second bore wall. An EGR assembly is mounted to the EGR inlet. Also, the air intake system includes air control means, located downstream of the valve within the main bore, for diffusing and redirecting the flow of air within the main bore such that less sound is generated within the intake manifold and less air recirculates back into the first portion of the main bore.

The present invention further contemplates a method for controlling the air flowing through a bore of an intake manifold from an upstream located throttle body, having a bore with a valve therein, used with an internal combustion engine, the method comprising the steps of: orienting the valve to allow air flow past the valve in the bore of the throttle body; redirecting the air flow to create a generally uniform series of pairs of oppositely oriented adjacent vortices in the air flow downstream of the valve and upstream of at least a portion of the bore in the intake manifold; feeding EGR gasses into the air flow just downstream of the location where the air flow is redirected; flowing the air through the bore of the intake manifold; and adding fuel to the air flow downstream of the location where the EGR gasses feed into the air flow.

Accordingly, an object of the present invention is to diffuse and redirect the air flow between a throttle valve and an intake manifold in order to reduce objectionable noise produced by the flowing air.

A further object of the present invention is to accomplish the first object of the present invention while minimizing air flow restrictions in the air intake system and otherwise avoiding interference with the operation of the air intake system.

An additional object of the present invention is to redirect the air flow between the throttle valve and intake manifold in order to allow for EGR gasses to enter the intake manifold immediately downstream of the throttle body such that the backflow of EGR gasses to the throttle valve will be reduced.

An advantage of the present invention is that the noise emitted from an intake manifold, particularly one made of plastic, is reduced during engine operation.

A further advantage of the present invention is that [contaminate] *contaminant* laden EGR gasses will not backflow to the downstream side of the throttle valve, thus reducing the chance for unwanted sludge to build up and cause a throttle valve sticking condition.

DETAILED DESCRIPTION OF THE PREFERRED EMBODIMENTS

Figure 1:
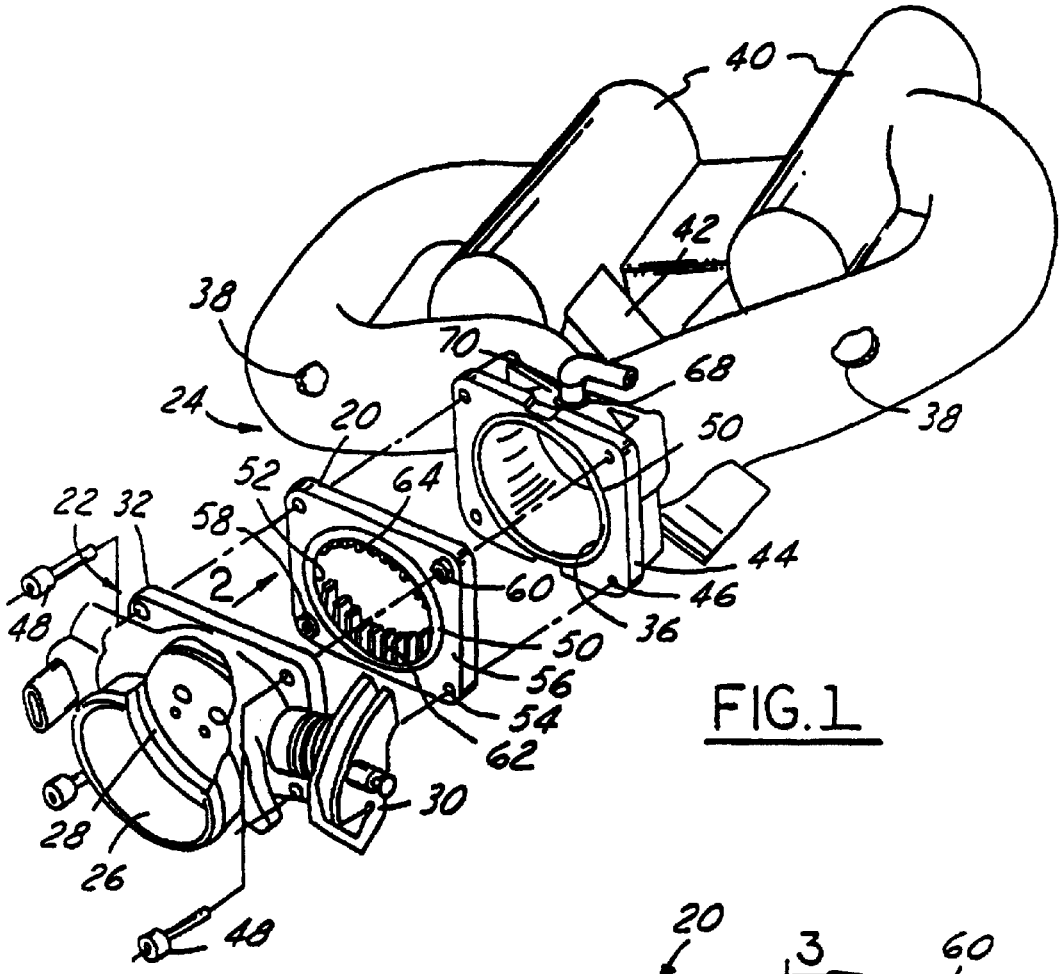
FIG. 1 is a partially exploded, perspective view of a portion of an air intake system for an internal combustion engine, in accordance with the present invention.
Figure 3:
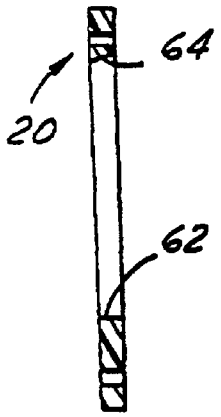
FIG. 3 is a sectional view taken from line 3-3 in FIG. 2.
Figure 2:
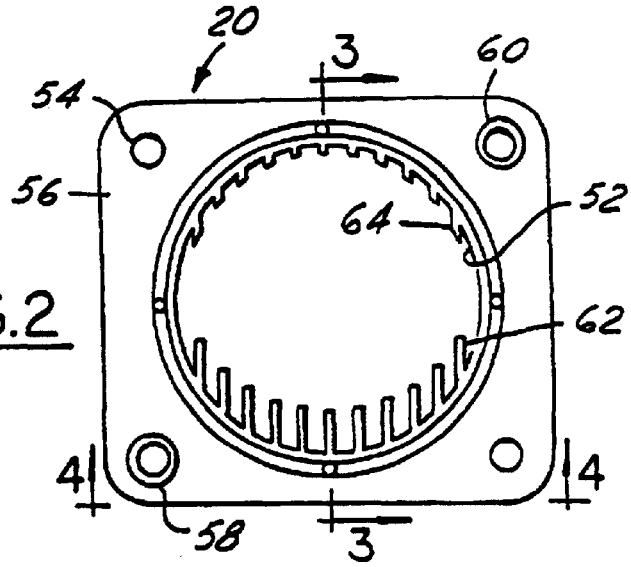
FIG. 2 is a side view of an air diffuser, taken in the direction of arrow 2 in FIG. 1.
Figure 4:
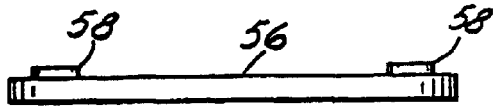
FIG. 4 is an end view taken along line 4-4 in FIG. 2.

FIGS. 1-4 illustrate an embodiment of the present invention in which an air diffuser 20 is mounted between a throttle body 22 and an intake manifold 24, preferably fabricated of a plastic type of material. The throttle body 22 illustrated is conventional with a generally cylindrical wall defining a main bore 26 within which a butterfly valve 28 is mounted to a throttle shaft and lever assembly 30, which controls the angle of rotation of the valve 28. A mounting base 32 portion of the throttle body 22 includes four bolt holes 34 for mounting the throttle body 22 to the intake manifold 24. The throttle body 22 can be made of metal or plastic, as desired.

The intake manifold 24 is illustrated here for a V-type of engine configuration, but the invention applies as well to in-line engine configurations. The intake manifold 24 includes a generally cylindrical wall defining a main bore 36 of substantially the same diameter as the main bore 26 of the throttle body 22. This bore 36 split into two smaller bores 38, one each for a respective one of the banks of cylinders in the engine, not shown. The smaller bores 38 lead to a corresponding one of two plenums 40 in the intake manifold 24, which in turn, direct the air through individual ports 42 to the engine. Fuel injectors, not shown, are located downstream of the throttle body 22, mounted to the intake manifold or the cylinder head of the engine, as the case may be, in a conventional manner. A mounting base 44 surrounds the entrance to the main bore 36 of the manifold 24, and includes four threaded bolt holes 46, for receiving bolts 48, which secures the throttle body 22 to the intake manifold 24.

An EGR inlet 68 to the intake manifold is located just downstream of the entrance to the main bore 36. An EGR assembly 70 mounts in this inlet 68 in order to provide a path for the Exhaust gasses that are recirculated from the engine exhaust to be drawn into the intake air stream. By being located at the upstream end of the intake manifold 24, the EGR gasses will flow into both banks of cylinders and can mix well with the intake air before entering the individual ports 42. Thus, in many instances it is desirable to locate the inlet 68 within about one main bore diameter of the upstream end of the intake manifold 24.

Mounted between the base 32 of the throttle body 22 and the base 44 of the manifold 24 is the air diffuser 20. The air diffuser 20 is basically a flat plate with a short, generally cylindrical wall defining a main bore 52 therethrough. The main bore 52 is sized to be essentially the same diameter as the main bore 26 in the throttle body 22. Four bolt holes 54 align with the bolt holes 34 in the throttle body 22, so that the main bores for the air diffuser 20, throttle body 22 and intake manifold 24 align. A recess 50 encircles the main bore 52, as well as a recess 50 around the main bore 36 of the intake manifold 24. These recesses are filled with convectional silicon sealer for sealing between the various parts.

In order to assure proper alignment and orientation of the air diffuser 20 relative to the throttle body 22, a pair of bosses extend from the upstream side 56 of the air diffuser 20. The first boss 58 has a cylindrical wall, which is sized to fit within a similarly shaped and sized recess, not shown, in the base 32 of the throttle body 22 about a corresponding bolt hole 34. The second boss 60 has a generally cylindrical wall with a pair of flats opposite one another on it. This second boss 60 is sized to fit within at similarly shaped and sized recess, not shown, in the base 32 of the throttle body 22 about a corresponding bolt hole 34. The bosses 58, 60 then, assure that the air diffuser 20 can only be installed in the proper orientation.

Extending from the wall of the main bore 52 of the air diffuser 20 are two sets of vanes, a lower set of vanes 62 and an upper set of vanes 64. The lower set of vanes 62 extend upward from the main bore 52 parallel to each other. The lower vanes 62 are as deep as the width of the diffuser 20 itself. The spacing between the lower vanes 62 is also approximately equal. The upper set of vanes 64 extend downward from the main bore 52 parallel to each other and are shorter than the lower set of vanes 62. The upper vanes 64 are generally equally spaced apart. The upper vanes 64 are also as deep as the width of the diffuser 20 itself as their bases, but the upstream edges taper as they extend downward from the bore wall. Also, the upper vanes 64 in the middle of the set are shorter than the others.

The reason for the size and shape variations between the upper and lower sets of vanes 62, 64 is not for air flow reasons, but because of possible interference with the butterfly valve 28 when it rotates toward its full open position. For the particular throttle body 22 illustrated herein, the butterfly valve rotates clockwise as viewed in FIG. 1, thus causing the upper edge of the valve 28 to tip downstream toward the air diffuser 20 while the lower edge tips upstream away from the air diffuser 20. The butterfly valve 28 is located downstream in the main bore 26 such that, for some open positions, the upper edge extends downstream beyond the bore 26, through the main bore 52 of the air diffuser 20 and into the main bore 36 of the intake manifold 24. The reason for the downstream location of the butterfly valve 28 is that the throttle body 22 is supported by the intake manifold 24 in a cantilever fashion, so the farther the throttle body 22 extends from the manifold 24, the more bending moment the mounting base 44 of the manifold 24 has to support. Consequently, the upper set of vanes 64 are limited in length for particular throttle body configurations in order to avoid interfering with the movement of the butterfly valve 28, while the lower set of vanes 62 do not have this interference concern.

An example of typical dimensions for the air diffuser 20 for a common V-6 engine having a nominal main bore diameter of about 66 millimeters (mm) would be generally equal center-to-center spacing of about 5 to 6 mm with the vanes 62,64 being about 1.5 mm thick and having an average height for all of the vanes of about 10 mm. The spacing between the vanes can be narrower. However, narrower spacing, in general, does not improve the noise attenuation sufficiently to justify the increased flow restrictions. Also, some minimum spacing limit is desirable to avoid the potential for sludge and ice build-up between the vanes, which can interfere with air flow. Additionally, the vanes 62,64 can be configured with a greater thickness, however, the trade-off between the amount of obstruction caused by the vanes (reducing horsepower of the engine) and the noise attenuation improvement by lengthening the vanes must be considered. The thickness of the plate portion of the air diffuse 20 can also be varied depending upon space constraints and the desired air flow effect. There is an increase in attenuation with increased plate thickness, however, throttle plate clearance is needed and increased length will also increases flow losses.

The operation of the air intake system will now be described. When the engine, not illustrated, is operating in an idle mode, the butterfly valve 28 is closed, and only a small amount of air passes through the throttle body 22 and into the manifold 24. As the butterfly valve 28 begins to open, the air now flows through the main bore 26 around the top and bottom edges of the butterfly valve 28. Generally, then, the air flow is along the top and bottom of the main bore 26, flowing generally between the vanes 62,64, which are located along the upper and lower surfaces of the air diffuser bore 52.

When the air flows past the partially open throttle plate, a high velocity turbulent air flow is created by the pressure drop across the throttle plate 28. As the air flows between the vanes 62,64, the vanes 62,64 will diffuse and redirect the air flow [patter] *pattern* such that the air creates small vortices of turbulence around each vane, but with each adjacent vorticy rotating in the opposite direction, thus canceling each other out. This reduces the noise created, which reduces the noise radiated from the intake manifold 24. So, proper spacing depends upon getting effective canceling out of vortices as opposed to random spacing which may just cause turbulence in the air flow.

Generally the whoosh noise generated is the greatest at tip-in or fast opening of the throttle plate and also at part throttle cruising/tip-in conditions, which can be mistaken by a driver for a vacuum leak on the engine. Thus, with this new air flow pattern, the whoosh noise generated from the air flow will be attenuated, consequently reducing the overall noise passing through the [stake] *intake* manifold 24 and into the engine compartment. Again, the amount of noise attenuation improvement due to an increase in the size of the vanes must be balanced against the amount of flow loss (and hence horsepower loss) due to the vanes being in the air stream.

Another effect of the diffusing and redirecting of the air flow by the vanes 62,64 is that any backflow from the swirling air just downstream of the butterfly valve 28 will be reduced. Thus, some of the inlet air that might otherwise be drawn back against the downstream side of the butterfly valve 28 will continue flowing downstream into the manifold 24. For this manifold assembly, where it is desirable to locate the EGR inlet 68 close to the upstream end of the intake manifold 24, some of the EGR gasses can become entrained in the inlet air which is drawn back to the downstream side of the butterfly valve 28. Since the EGR gasses are likely to contain [contaminates]*contaminants*, these can settle on the butterfly valve 28 and downstream portion of the throttle body main bore 26 to form sludge. Consequently, the vanes 62,64, by diffusing and redirecting the inlet air, will significantly reduce the amount of backflow and hence the risk of [contaminates] *contaminants* from the EGR gasses causing build up of sludge on and a sticking condition of the butterfly valve 28.

Figure 5:
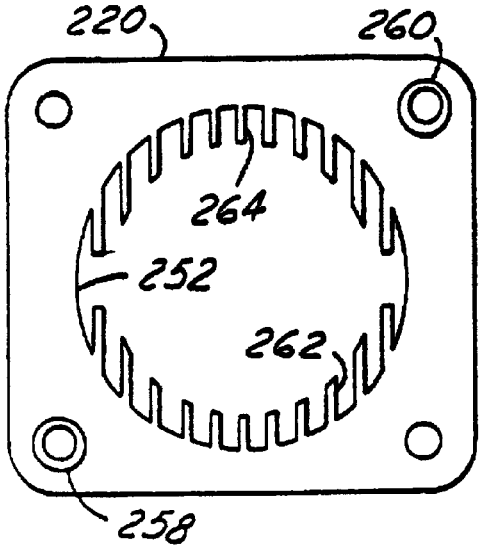
FIG. 5 is a side view of an air diffuser, similar to FIG. 2, illustrating a second embodiment of the present invention.

A second embodiment of the present invention is illustrated in FIG. 5. This air diffuser 220 is used in place of the air diffuser 20, illustrated in FIG. 1, for this embodiment. In this second embodiment, similar elements are similarly designated, but with 200 series numbers. The vanes 262,264 in the air diffuser 220 are the same length for both the upper set 264 and the lower set 262. Both taper downstream as they extend inward into the bore 252, in order to avoid potential interference with the throttle valve 28 on the upper vanes 264. Further, the first boss 258 and second boss 260 are sized and shaped the same. The advantage of tapering both sets of vanes 262,264 and providing equal lengths is that the air diffuser 220 is now symmetrical between its top and bottom and can thus be installed with either set of vanes acting as the upper vanes, making assembly somewhat easier. The disadvantage is the risk of interference between the upper vanes 262 and the throttle valve 28 since the upper vanes 262 are now longer, depending upon the configuration of the particular throttle body 22 one employs.

Figure 6:
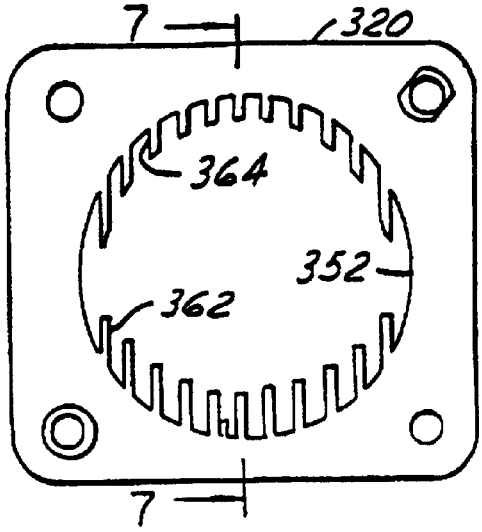
FIG. 6 is a side view of an air diffuser, similar to FIG. 2, illustrating a third embodiment of the present invention.
Figure 7:
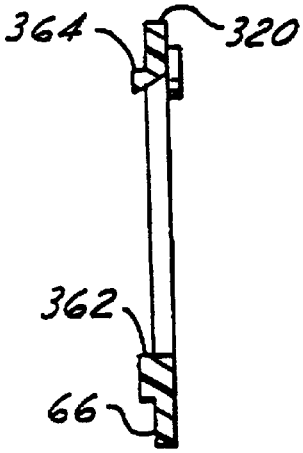
FIG. 7 is a sectional view taken along line 7-7 in FIG. 6.

FIGS. 6 and 7 illustrate a third embodiment of the present invention. This air diffuser 320 is used in place of the air diffuser 20, illustrated in FIG. 1, for this embodiment. In this third embodiment, similar elements are similarly designated, but with 300 series numbers. The upper vanes 364 and the lower vanes 362 now not only extend into the bore 352, but also extend aft of the downstream surface 66 of the air diffuser 320. This allows for more influence on the air flow pattern by the vanes 362,362 without having to increase the thickness of the plate itself, assuring that the space taken by the air diffuser 320 is minimized.

Figure 8:
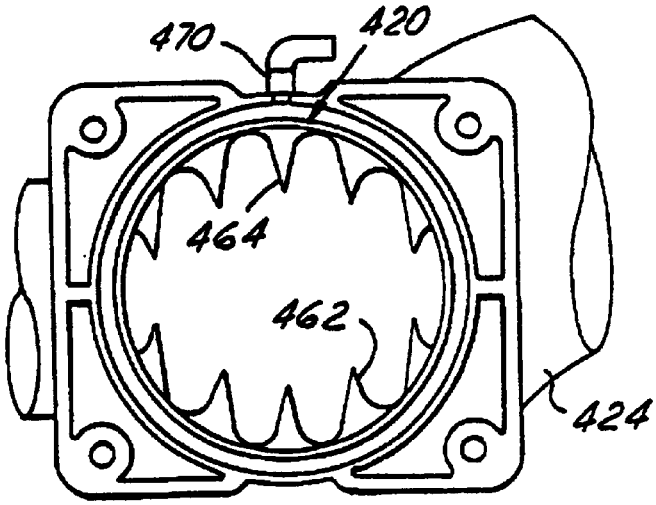
FIG. 8 is a partial, side view of an intake manifold illustrating a fourth embodiment of the present invention.

FIG. 8 illustrates a fourth embodiment of the present invention. This integral air diffuser 420 is used in place of the air diffuser 20, illustrated in FIG. 1, for this embodiment. In this fourth embodiment, similar elements are similarly designated, but with 400 series numbers. The air diffuser 420 is now not formed from a separate plate, but is integral with the intake manifold 424. The lower vanes 462 and the upper vanes 464 are molded into the main bore 436 of a plastic intake manifold 424. Consequently, the chance for interference between the vanes and the butterfly valve 28, seen in FIG. 1, is lessened, while also minimizing the cantilever of the throttle body from the intake manifold 424 and the overall size of this structure. Further, one less part and seal need to be assembled. On the other hand, moldings for plastic intake manifolds 424 generally are complex and this adds to the complexity of the molding, which may or may not make this a desirable alternative depending upon ones design constraints. Also, the EGR assembly 470 may need to be mounted downstream farther into the manifold 424 because of the location of the upper vanes 464.

Figure 9:
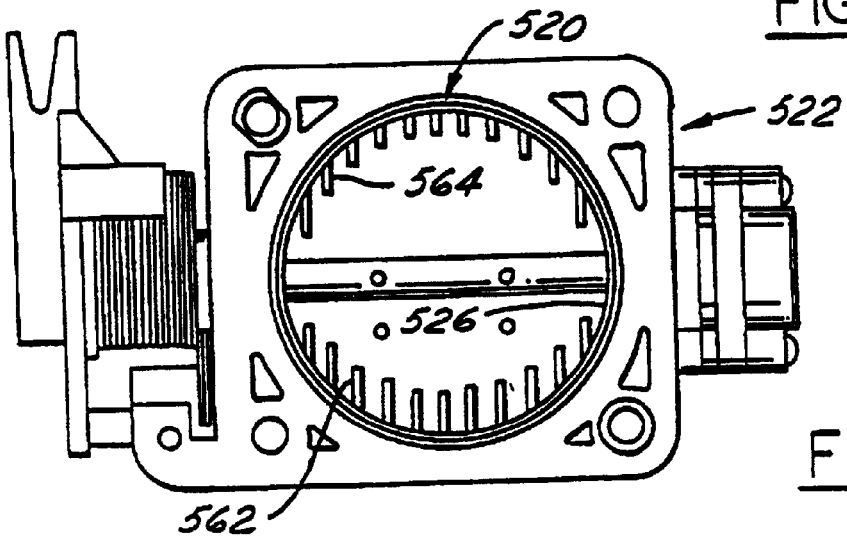
FIG. 9 is a side view of a throttle body, illustrating a fifth embodiment of the present invention.

FIG. 9 illustrates a fifth embodiment of the present invention. This integral air diffuser 520 is used in place of the air diffuser 20, illustrated in FIG. 1, for this embodiment. In this fifth embodiment, similar elements are similarly designated, but with 500 series numbers. The air diffuser 520 again is not formed from a separate plate, but now is integral with the throttle body 522, with the lower set of vanes 562 and the upper set of vanes 564 mounted to the wall of the main bore 526 of the throttle body 522. Again, one less part and seal need to be assembled, and the overall size of the structure can be reduced. On the other hand, this complicates the fabrication of the throttle body 522 and makes designing to avoid interference between the upper vanes 564 and the butterfly valve more significant, which may or may not be desirable for a given situation.

Figure 10:
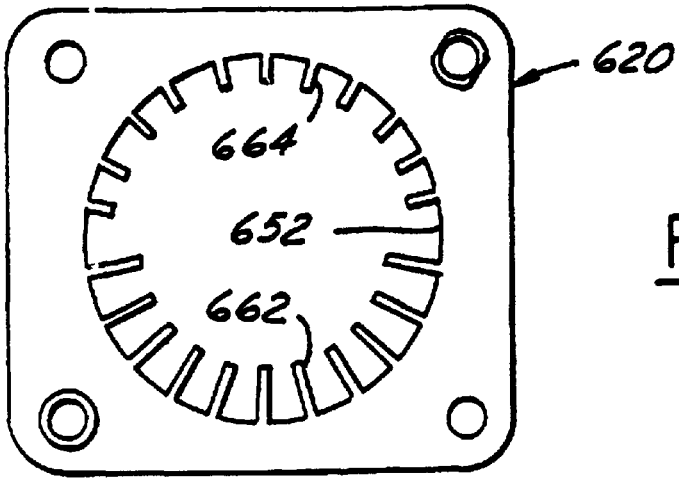
FIG. 10 is a side view of an air diffuser, similar to FIG. 2, illustrating a sixth embodiment of the present invention.

A sixth embodiment of the present invention is shown in FIG. 10. This air diffuser 620 is used in place of the air diffuser 20, illustrated in FIG. 1, for this embodiment. In this sixth embodiment, similar elements are similarly designated, but with 600 series numbers. The upper set of vanes 664 and the lower set of vanes 662 now extend radially into the main bore 652, with the upper set of vanes 664 shorter than the lower set 662 and tapered as they extend radially inward. The taper is done for the same potential interference reasons as with the first embodiment. The radially oriented vanes 662,664 can work as compared to parallel vanes, but are not generally as effective as with parallel spacing. The reason being that at throttle tip-in conditions, if the vane spacing is set to its maximum effectiveness at the outer radial locations of the vanes 662,664, the proper diffusion and redirection of the air flow may not be as effective at the inner radial locations since the ends of the fins approach one another as they extend radially inward, thus changing the amount of gap between them.

Figure 11:
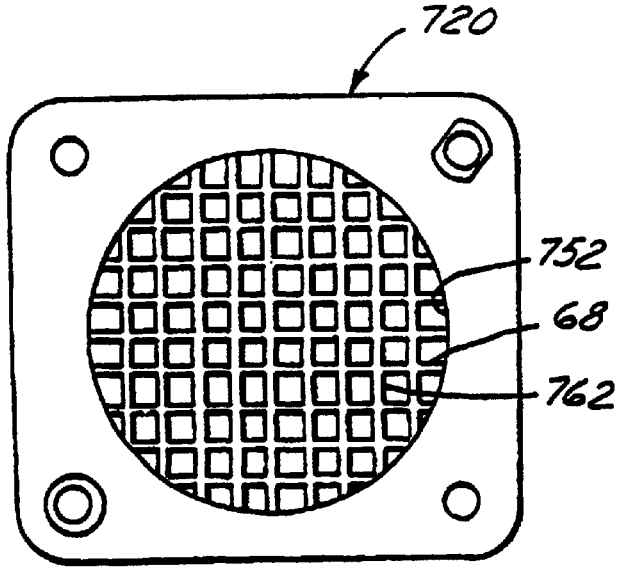
FIG. 11 is a side view of an air diffuser, similar to FIG. 2, illustrating a seventh embodiment of the present invention.

FIG. 11 illustrates a seventh embodiment of the present invention. This air diffuser 720 is used in place of the air diffuser 20, illustrated in FIG. 1, for this embodiment. In this seventh embodiment, similar elements are similarly designated, but with 700 series numbers. The upper set of parallel vanes and the lower set of parallel vanes are really now just one [continues] *continuous* set of vertical vanes 762, along with the addition of parallel horizontal vanes 68. This forms a full grid pattern of vanes. The thickness of these vanes is constant along the length of the vanes. While the full grid pattern is most effective for diffusing and redirecting the air flow and thus for attenuation of the noise, there are very substantial flow losses created due to the significant amount of blockage of the main bore 752. This blockage will thus significantly reduce the maximum horsepower of the engine.

Figure 12:
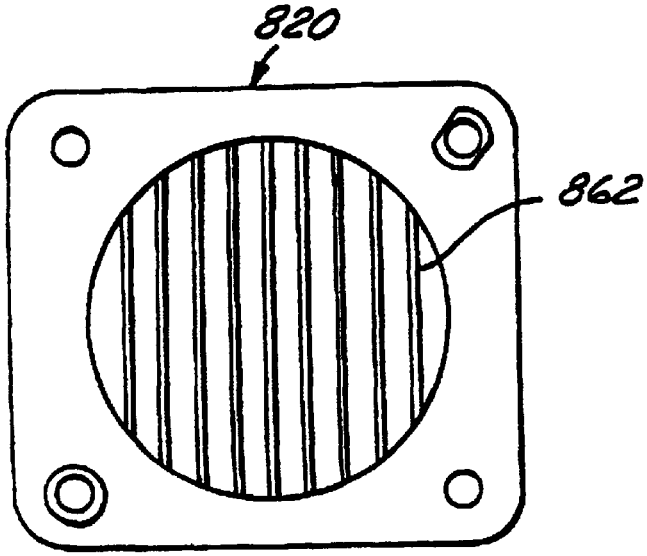
FIG. 12 is a side view of an air diffuser, similar to FIG. 2, illustrating an eighth embodiment of the present invention.

FIG. 12 illustrates an eighth embodiment of the present invention. This air diffuser 820 is used in place of the air diffuser 20, illustrated in FIG. 1, for this embodiment. In this eighth embodiment, similar elements are similarly designated, but with 800 series numbers. This embodiment employs the same parallel vertical vanes 862 as in the seventh embodiment, but without the addition of horizontal vanes. This is a compromise from the seventh embodiment in that the noise attenuation will not be as great, but the blockage will also be less. For both the seventh and eighth embodiments, one must keep in mind that the location of the butterfly valve in the throttle body is important because of the potential for interference between the grid or line pattern and an edge of the valve when the valve is in certain open positions.

While certain embodiments of the present invention have been described in detail, those familiar with the art to which this invention relates will recognize various alternative designs and embodiments for practicing the invention as defined by the following claims.

I claim:

[1. An air intake system for controlling the flow of air into an internal combustion engine comprising:

a throttle body including a first bore wall defining a first portion of a main bore and a valve mounted within the first portion of the main bore, with the valve being movable to selectively restrict the flow of air through the main bore;

an intake manifold including a second bore wall defining a second portion of the main bore, with the second bore wall having an upstream end, and the manifold further including means for mounting the throttle body relative to the intake manifold such that the first and the second portions of the main bore align with one another, with the intake manifold being downstream of the throttle body, and with the manifold including an EGR inlet adjacent the upstream end of the second bore wall;

an EGR assembly mounted to the EGR inlet; and air control means, located downstream of the valve within the main bore, for diffusing and redirecting the flow of air within the main bore such that less sound is generated within the intake manifold and less air recirculates back into the first portion of the main bore.]

[2. The air intake system of claim 1 wherein the air control means includes a plurality of vanes, spaced from one another, forming a first set, extending from one of the portions of the main bore wall into the main bore.]

[3. The air intake system of claim 2 wherein the first set of vanes is mounted to the first bore wall.]

[4. The air intake system of claim 2 wherein the first set of vanes are mounted to the second bore wall.]

[5. The air intake manifold of claim 2 wherein the vanes in the first set of vanes extend downstream into the second portion of the main bore.]

[6. The air intake system of claim 2 wherein the first set of vanes are oriented and extend radially relative to the main bore.]

[7. The air intake system of claim 6 wherein the first set of vanes taper as they extend away from one of the portions of the bore wall.]

[8. The air intake system of claim 6 wherein the air control means also include a second set of radial vanes, spaced from one another, extending into a different portion of the main bore than the first set.]

[9. The air intake system of claim 8 further including an air diffuser plate having a third bore wall defining a third portion of the main bore aligned with the first and the second portions of the main bore, with the air diffuser plate mounted between the throttle body and the intake manifold, and wherein the first and the second set of radial vanes are mounted to the third bore wall.]

[10. The air intake system of claim 8 wherein the average length of first set of radial vanes is shorter than the average length of the second set of radial vanes.]

[11. The air intake system of claim 2 wherein the first set of vanes are oriented and extend from a portion of the main bore wall parallel to and spaced from one another.]

[12. The air intake system of claim 11 wherein the air control means also includes a second set of parallel vanes, spaced from one another, extending from a different portion of the bore wall than the first set.]

[13. The air intake system of claim 12 wherein the air control means includes an air diffuser plate having a third bore wall defining a third portion of the main bore aligned with the first set and second portion of the main bore, with the air diffuser plate mounted between the throttle body and the intake manifold wherein the first and second set of parallel vanes are mounted on the third bore wall.]

[14. The air intake system of claim 1 wherein the second bore wall is defined by a diameter and the EGR inlet is located on the intake manifold within about one diameter of the upstream end of the second bore wall.]

[15. An air intake system for controlling the flow of air into an internal combustion engine comprising:

a throttle body including a first bore wall defining a first portion of a main bore and a valve mounted within the first portion of the main bore, with the valve being movable to selectively restrict the flow of air through the main bore;

an intake manifold including a second bore wall defining a second portion of the main bore, with the second bore wall having an upstream end, and the manifold further including means for mounting the throttle body relative to the intake manifold such that the first and the second portions of the main bore align with one another, with the intake manifold being downstream of the throttle body, and with the manifold including an EGR inlet adjacent the upstream end of the second bore wall;

an EGR assembly mounted to the EGR inlet;

an air diffuser plate having a third bore wall defining a third portion of the main bore aligned with the first and second portion of the main bore, with the air diffuser plate mounted between the throttle body and the intake manifold; and air control means, located downstream of the valve within the main bore, for diffusing and redirecting the flow of air within the main bore such that less sound is generated within the intake manifold and less air recirculates back into the first portion of the main bore.]

[16. The air intake system of claim 15 wherein the air control means includes a plurality of vanes, spaced from one another, forming a first set, extending from one of the portions of the third bore wall into the main bore.]

[17. The air intake system of claim 16 wherein the air control means also includes a second set of vanes mounted to and extending from the third bore wall.]

[18. A method for controlling the air flowing through a bore of an intake manifold from an upstream located throttle body, having a bore with a valve therein, used with an internal combustion engine, the method comprising the steps of:

orienting the valve to allow air flow past the valve in the bore of the throttle body;

redirecting the air flow to create a generally uniform series of pairs of oppositely oriented advance vortices in the air flow downstream of the valve and upstream of at least a portion of the bore in the intake manifold;

feeding EGR gasses into the air flow just downstream of the location where the air flow is redirected;

flowing the air through the bore of the intake manifold; and adding fuel to the air flow downstream of the location where the EGR gasses feed into the air flow.]

[19. The method of claim 18 wherein the step of redirecting the air flow includes providing vanes extending into the air flow downstream of the valve.]

[20. The method of claim 18 wherein the step of redirecting includes providing diffuser means for supporting vanes located between the throttle body and the intake manifold, and providing a plurality of vanes extending parallel to each other from the diffuser means into the air flow.]

*21. An air intake system for controlling the flow of air into an internal combustion engine, the air intake system comprising an intake manifold, a bore wall defining a main bore for receiving airflow, a throttle assembly, and a seal, the seal surrounding said main bore and defining a single sealed region, the bore wall including at least a plurality of vanes extending partially into the main bore and only partially into flow through said sealed region for reducing noise emanating from the intake system associated with airflow through the intake system, wherein said bore wall has a substantially circular cross section, and where the throttle assembly is coupled upstream of the seal.*

*22. The method of claim 21 wherein the vanes are a portion of a grid, and where the intake manifold comprises plastic and the throttle assembly comprises plastic.*

*23. The method of claim 22 wherein the vanes are in a common plane.*

*24. An air intake system for a fuel injected internal combustion engine including a throttle body having a throttle valve for controlling airflow through a main bore in fluid communication with an air intake manifold, the system further comprising an air diffuser having a seal defining a sealed region and vanes extending into the main bore, said diffuser positioned downstream of the throttle valve and throttle body in the main bore to reduce noise created by air flowing past the throttle valve, said seal interfacing the diffuser and the throttle body.*

*25. The air intake system of claim 24 wherein the air diffuser comprises at least one vane spanning the main bore, where said diffuser has 11 vanes or less in parallel with one another.*

*26. The air intake system of claim 25 wherein the at least one vane comprises a plurality of parallel vanes spanning at least a portion of the main bore, wherein a space between at least two of said plurality of vanes is about 3.5 mm to 4.5 mm.*

*27. The system of claim 24 wherein the vanes are a portion of a grid, and where the intake manifold comprises plastic and the throttle body comprises plastic.*

*28. The system of claim 24 wherein the vanes are in a common plane.*

*29. An air intake system for a fuel injected internal combustion engine including a throttle body, an air intake manifold, and an air diffuser arranged in the intake system downstream of the throttle body and upstream of a plurality of fuel injectors for reducing noise emanating from the intake system, the air diffuser having a single main bore defined by a bore wall and a set of vanes substantially equally spaced from one another and extending from a portion of the bore wall into the single main bore, where the main bore is coupled downstream of the throttle body via a seal surrounding the main bore.*

*30. The system of claim 29 wherein the vanes are a portion of a grid, and where the intake manifold comprises plastic and the throttle body comprises plastic.*

*31. The system of claim 29 wherein the vanes are in a common plane.*

*32. An air intake system for a fuel injected internal combustion engine including a throttle body, an air intake manifold, and an air diffuser arranged in the intake manifold downstream of the throttle body and upstream of a plurality of fuel injectors for reducing noise emanating from the intake system, the air diffuser having a main bore defined by a bore wall and a plurality of radial vanes extending from at least a portion of the bore wall into the main bore, wherein a*

*space between at least two of said plurality of vanes is about 3.5 mm to 4.5 mm.*

*33. An air intake system for a fuel injected internal combustion engine including a throttle body, an air intake manifold, and an air diffuser arranged in the intake system to reduce noise emanating from the intake system due to air flowing through the throttle body, the air diffuser having a single region main bore defined by a bore wall and a first set of vanes spaced from one another and extending parallel to one another from a portion of the bore wall into the single region main bore, and a second set of vanes spaced from one another and extending parallel to one another from a different portion of the bore wall than the first set into the single region main bore, the first and second sets of vanes being in a common plane.*

*34. An air intake system for a fuel injected internal combustion engine including a throttle body, an air intake manifold, and an air diffuser arranged in the intake system to reduce noise emanating from the intake system due to air flowing through the throttle body, the air diffuser having a main bore defined by a bore wall and a first set of vanes spaced from one another and extending parallel to one another from a portion of the bore wall into the main bore, and a second set of vanes spaced from one another and extending parallel to one another from a different portion of the bore wall than the first set into the main bore, wherein the air diffuser comprises a separable component mounted between the throttle body and the air intake manifold, the air diffuser further comprising a seal surrounding said main bore and defining a single region, where one of said first and second sets of vanes extends only partially into said region, and one of said first and second sets of vanes includes 11 vanes or less.*

*35. The air intake system of claim 34 wherein the air diffuser comprises a plate having an upstream face and a downstream face with the vanes extending beyond the face of at least one of the upstream and downstream faces.*

*36. An air intake system for a fuel injected internal combustion engine including a throttle body having a first bore wall defining a first portion of a main bore and a throttle valve for controlling airflow through the main bore, an air intake manifold in fluid communication with the throttle body and including a second bore wall defining a second portion of the main bore, the air intake system comprising an air diffuser disposed downstream of the throttle valve and having at least two vanes extending across the main bore connecting to two locations of the bore wall to reduce noise associated with air flowing past the throttle valve, wherein said air flows through a space between said vanes of about 3.5 mm to 4.5 mm.*

*37. An air intake system for a fuel injected internal combustion engine including a throttle body having a first bore wall defining a first portion of a main bore and a throttle valve for controlling airflow through the main bore, an air intake manifold in fluid communication with the throttle body and including a second bore wall defining a second portion of the main bore, the air intake system comprising a diffuser having a grid pattern for diffusing and redirecting air flowing through the main bore to reduce noise emanating through the intake system associated with air flowing past the throttle valve, wherein at least one hole in said grid is between 3.5 mm to 4.5 mm.*

*38. An air intake system for a fuel injected internal combustion engine including a throttle body having a first bore wall defining a first portion of a main bore and a throttle valve for controlling airflow through the main bore, an air intake manifold in fluid communication with the throttle body and including a second bore wall defining a second portion of the main bore, the air intake system having means for diffusing and redirecting air flowing through the main bore to reduce noise associated with air flowing past the throttle valve, wherein said main bore has a substantially circular cross section, and where the means for diffusing and redirecting air flowing through the main bore being coupled between the first bore wall and the second bore wall, the means having a seal.*

*39. An air intake system for controlling the flow of air into an internal combustion engine comprising:*

*a throttle body including a first bore wall defining a first portion of a main bore and a valve mounted within the first portion of the main bore with the valve being movable to selectively restrict flow of air through the main bore;*

*an intake manifold including a second bore wall defining a second portion of the main bore, with the second bore wall having an upstream end, and the manifold further including means for mounting the throttle body relative to the intake manifold such that the first and the second portions of the main bore align with one another, with the intake manifold being downstream of the throttle body, and with the manifold including an EGR inlet adjacent the upstream end of the second bore wall; and*

*a plurality of parallel vanes spaced from one another and in a common plane, the vanes disposed downstream of the valve and extending into the main bore to reduce sound generated within the intake system associated with air flowing past the valve, the vanes coupled between the throttle body and intake manifold via a sealed connection.*

*40. A method for use in a fuel injected internal combustion engine having a throttle body with a throttle valve for selectively restricting airflow through an intake passage, an intake manifold, and a plurality of fuel injectors for injecting fuel into the air downstream of the throttle valve, the method comprising:*

*redirecting air flowing past the throttle valve using a diffusing element downstream of the throttle valve and upstream of the intake manifold to reduce noise associated with the air flowing past the throttle valve, said diffusing element having vanes protruding into the intake passage creating at least one space between 3.5 mm and 4.5 mm wide.*

*41. A method for use in a fuel injected internal combustion engine having a throttle body with a throttle valve for selectively restricting airflow through an intake passage, an intake manifold, and a plurality of fuel injectors for injecting fuel into the air downstream of the throttle valve, the method comprising:*

*redirecting air flowing past the throttle valve using a plurality of diffusing elements arranged in a grid pattern spanning at least a portion of the intake passage downstream of the throttle valve and upstream of the intake manifold to reduce noise associated with the air flowing past the throttle valve, wherein at least one hole in said grid is between 3.5 and 4.5 mm.*

*42. A method for use in a fuel injected internal combustion engine having a throttle body with a throttle valve for selectively restricting airflow through an intake passage, an intake manifold, and a plurality of fuel injectors for injecting fuel into the air downstream of the throttle valve, the method comprising:*

*modifying airflow past the throttle valve using a diffusing element having a grid pattern and extending across at*

*least a portion of the intake passage downstream of the throttle valve and upstream of the fuel injectors to reduce noise associated with the air flowing past the throttle valve, where said diffusing element is surrounded by a seal creating only a single chamber containing said grid, said seal coupling the diffusing element downstream of the throttle body.*

*43. The method of claim 42 wherein the throttle body and intake manifold comprise plastic, and the airflow past the throttle enters the plastic intake manifold.*

*44. The method of claim 42 vanes of the grid are in a common plane.*

*45. The system of claim 44 wherein the vanes are in a common plane.*

*46. An air diffuser for use with an air intake system of a fuel injected internal combustion engine having a throttle body and an air intake manifold, the air diffuser comprising:*

*a body defining an air passage and adapted for mounting between the throttle body and the intake manifold; and*

*a plurality of vanes extending from the body into the air passage to redirect air flowing through the passage and reduce associated noise;*

*where said body includes a seal creating only a single region surrounding said plurality of vanes and said air passage, wherein a space between at least two vanes is between about 3.5 mm and 4.5 mm.*

*47. An air diffuser for use with an air intake system of a fuel injected internal combustion engine having a throttle body and an air intake manifold, the air diffuser comprising:*

*a body defining an air passage and adapted for mounting between the throttle body and the intake manifold, said body including a seal surrounding said air passage; and*

*a plurality of vanes spaced from one another and extending from the body only partially into the air passage to redirect air flowing through the passage and reduce associated noise.*

*48. The air diffuser of claim 47 wherein the plurality of vanes spans the air passage.*

*49. The air diffuser of claim 48 wherein the plurality of vanes are substantially parallel.*

*50. The air diffuser of claim 47 wherein at least some of the plurality of vanes extend inward from the body toward a center of the air passage, and a space between at least two vanes is about 3.5 mm to 4.5 mm.*

*51. The air diffuser of claim 47 wherein the body defines a substantially circular air passage.*

*52. The air diffuser of claim 47 wherein at least some of the plurality of vanes taper as they extend into the air passage.*

*53. An air diffuser for use with an air intake system of a fuel injected internal combustion engine having a throttle body and an air intake manifold, the air diffuser comprising:*

*a body defining an air passage and adapted for mounting between the throttle body and the intake manifold, said body including a seal surrounding the air passage;*

*a plurality of vanes spaced from one another and extending from the body into the air passage to redirect air flowing through the passage and reduce associated noise;*

*wherein the plurality of vanes spans the air passage; and*

*wherein the plurality of vanes forms a grid pattern.*

*54. The air diffuser of claim 53 wherein the vanes are in a common plane.*

*55. An air diffuser for use with an air intake system of an internal combustion engine including a throttle body and an air intake manifold, the air diffuser comprising:*

*a body adapted for mounting between the throttle body and the air intake manifold, the body having a main passage for accommodating airflow from the throttle body to the air intake manifold, said main passage surrounded by a seal;*

*a first set of vanes spaced from one another and extending from a first portion of the body into the main passage and within said seal; and*

*a second set of vanes spaced from one another and extending from a second portion of the body into the main passage and within said seal, wherein an average length of the first set of vanes is less than an average length of the second set of vanes.*

*56. An air intake system for controlling the flow of air into a fuel injected internal combustion engine having a plurality of fuel injectors, the air intake system comprising an intake manifold having a wall defining a main air passage for receiving airflow, the wall including a diffusing element within the main air passage upstream of the plurality of fuel injectors for reducing noise emanating from the intake system associated with airflow through the intake system, said element having only a single air passage surrounded by a seal, the seal further coupling the element to an upstream throttle body.*

*57. The system of claim 56 wherein the diffusing element includes a grid, and where the intake manifold comprises plastic and the throttle body comprises plastic.*

*58. An air intake system for controlling the flow of air into an internal combustion engine including an EGR for selectively diverting a portion of exhaust gas to the intake system via an EGR inlet, the air intake system comprising an intake manifold having a wall defining a main air passage for receiving airflow, the wall including an integral air diffuser extending into the main bore upstream of the EGR inlet for reducing noise emanating from the intake system associated with airflow through the intake system and reducing upstream flow of EGR gases.*

*59. A method for use in a fuel injected internal combustion engine having a throttle body with a throttle valve for selectively restricting airflow therethrough, an intake manifold, and a plurality of fuel injectors for injecting fuel into the air downstream of the throttle valve, the method comprising:*

*modifying airflow through the intake using a plurality of vanes extending into the airflow downstream of the throttle valve to reduce noise associated with the air flowing past the throttle valve, wherein a space between at least some of said plurality of vanes is about 3.5 mm to 4.5 mm.*

*60. A method for use in a fuel injected internal combustion engine having a plastic throttle body with a throttle valve for selectively restricting airflow therethrough, a plastic intake manifold, and a plurality of fuel injectors for injecting fuel into the air downstream of the throttle valve, the method comprising:*

*modifying airflow through the plastic throttle body using a plurality of substantially evenly spaced parallel vanes integrally formed in the throttle body and extending into the airflow downstream of the throttle valve and upstream of the intake manifold to reduce noise associated with the air flowing past the throttle valve.*

*61. An air intake system for controlling the flow of air into a fuel injected internal combustion engine, the system comprising:*

*a plastic throttle body including a first wall defining a first portion of a main air passage and a valve mounted within the first portion of the main air passage with the*

*valve being movable to selectively restrict flow of air through the main air passage, the plastic throttle body having an integrally formed air diffuser disposed downstream of the valve to reduce sound generated within the intake system associated with air flowing past the valve.*

*62. An air intake system for controlling the flow of air into a fuel injected internal combustion engine, the system comprising:*

*a plastic throttle body including a first wall defining a first portion of a main air passage and a valve mounted within the first portion of the main air passage with the valve being movable to selectively restrict flow of air through the main air passage, the plastic throttle body having an integrally formed air diffuser disposed downstream of the valve to reduce sound generated within the intake system associated with air flowing past the valve; and*

*a plastic intake manifold including a second wall defining a second portion of the main air passage, with the second wall having an upstream end, and the manifold further including means for mounting the plastic throttle body relative to the plastic intake manifold such that the first and the second portions of the main air passage align with one another, with the plastic intake manifold being downstream of the plastic throttle body, and with the manifold including an EGR inlet adjacent the upstream end of the second wall.*

*63. An air intake system for controlling the flow of air into a fuel injected internal combustion engine having a plurality of fuel injectors, the system comprising:*

*a plastic throttle body including a first wall defining a first portion of a main air passage and a valve mounted within the first portion of the main air passage with the valve being movable to selectively restrict flow of air through the main air passage; and*

*a plastic intake manifold including a second wall defining a second portion of the main air passage, with the second wall having an upstream end, and the manifold further including means for mounting the plastic throttle body relative to the plastic intake manifold such that the first and the second portions of the main air passage align with one another, with the plastic intake manifold being downstream of the plastic throttle body, and with the manifold including an EGR inlet adjacent the upstream end of the second wall, the plastic intake manifold having an integrally formed air diffuser disposed downstream of the valve and upstream of the fuel injectors to reduce sound generated within the intake system and to reduce upstream flow of EGR gasses past the throttle valve.*

*64. An air intake system for controlling the flow of air into a fuel injected internal combustion engine having a throttle valve disposed upstream of a plurality of fuel injectors, the system comprising:*

*a plastic intake manifold including a wall defining a main air passage, with the wall having an upstream end, the manifold further including an integrally formed air diffuser disposed downstream of the throttle valve and upstream of the fuel injectors to reduce sound generated within the intake system associated with air flowing past the throttle valve.*

*65. An air intake system for controlling the flow of air into a fuel injected internal combustion engine having an intake manifold for receiving and distributing intake air to a plurality of cylinders comprising a plastic throttle body including a main air passage having a plurality of integrally formed plastic vanes extending into the main air passage for reducing noise associated with airflow therethrough.*

*66. An air intake system for controlling the flow of air into a fuel injected internal combustion engine comprising a plastic throttle body including a main air passage having a plurality of substantially equally spaced parallel vanes extending into the main air passage, the vanes being integrally formed with the plastic throttle body.*

*67. An air intake system for controlling the flow of air into a fuel injected internal combustion engine having a plurality of fuel injectors, the system comprising:*

*a plastic throttle body having a main air passage and a throttle valve mounted within the main air passage with the throttle valve being movable to selectively restrict flow of air through the main air passage, the plastic throttle body having an integrally formed air diffuser disposed downstream of the throttle valve and upstream of the fuel injectors to reduce sound generated within the intake system.*

*68. An air intake system for controlling the flow of air into a fuel injected internal combustion engine having a plurality of fuel injectors, the system comprising:*

*a plastic throttle body having a main air passage and a throttle valve mounted within the main air passage with the throttle valve being movable to selectively restrict flow of air through the main air passage, the plastic throttle body having an integrally formed air diffuser having a grid pattern disposed downstream of the throttle valve and upstream of the fuel injectors to reduce sound generated within the intake system.*

*69. An air intake system for controlling the flow of air into a fuel injected internal combustion engine having a plurality of fuel injectors, the system comprising:*

*a plastic throttle body having a main air passage and a throttle valve mounted within the main air passage with the throttle valve being movable to selectively restrict flow of air through the main air passage; and*

*an air diffuser disposed downstream of the throttle valve and upstream of the fuel injectors to reduce sound generated within the intake system, said diffuser having a plurality of vanes, with a space between at least some of said vanes being about 3.5 mm to 4.5 mm.*

*70. An air intake system for controlling the flow of air into a fuel injected internal combustion engine having a plurality of fuel injectors, the system comprising:*

*a plastic throttle body having a main air passage and a throttle valve mounted within the main air passage with the throttle valve being movable to selectively restrict flow of air through the main air passage; and*

*an air diffuser having a grid pattern disposed downstream of the throttle valve and throttle body and upstream of the fuel injectors to reduce sound generated within the intake system, wherein at least one hole in said grid is about 3.5 to 4.5 mm wide, said diffuser further coupled to the throttle body via a seal surrounding the main air passage.*

*71. An air intake system for controlling the flow of air into a fuel injected internal combustion engine having a plurality of fuel injectors, the system comprising:*

*a plastic throttle body having a main air passage and a throttle valve mounted within the main air passage with the throttle valve being movable to selectively restrict flow of air through the main air passage; and*

*a plastic air diffuser disposed downstream of the throttle valve and upstream of the fuel injectors to reduce sound*

*generated within the intake system, said air diffuser including at least a plurality of spaces beign about 3.5 mm to 4.5 mm.*

*72. A system for controlling flow into an internal combustion engine, comprising:*

*a throttle body having a throttle valve for controlling airflow through a main bore;*

*an air intake manifold coupled to said throttle body, at least one of the throttle body and the air intake manifold including an air diffuser positioned downstream of the throttle valve in the main bore to reduce noise created by air flowing past the throttle valve, said air diffuser defining a single air passage for said airflow; and*

*fuel injectors located downstream of the throttle body.*

*73. The system recited in claim 72 wherein said fuel injectors are mounted to the intake manifold.*

*74. The system recited in claim 72 wherein the engine has a cylinder head, and said fuel injectors are mounted to said cylinder head.*

*75. The system recited in claim 72 wherein the intake manifold comprises plastic.*

*76. The system recited in claim 72 wherein the throttle body comprises plastic.*

*77. The system recited in claim 72 wherein the air diffuser comprises a seal.*

*78. The system recited in claim 72 wherein the air diffuser comprises a first set of parallel vanes and a second set of parallel vanes forming a grid pattern.*

*79. The system recited in claim 72 wherein the air diffuser comprises at least one vane extending into the main bore.*

*80. The system recited in claim 72 wherein the air diffuser comprises at least one vane spanning the main bore.*

*81. The system recited in claim 72 wherein the air diffuser comprises at least one vane extending only partially into the main bore and only partially into said single air passage.*

*82. The system recited in claim 72 further comprising an EGR assembly located downstream of said throttle valve.*

*83. The system recited in claim 82 wherein said air diffuser is plastic.*

*84. The system recited in claim 72 wherein said engine is a V-type engine.*

*85. The system recited in claim 84 wherein said engine is a V-6 engine.*

*86. The system recited in claim 72 wherein said air diffuser is integrally formed in said manifold.*

*87. The system recited in claim 72 wherein said air diffuser is integrally formed in said throttle body.*

*88. The system recited in claim 72 wherein said air diffuser is plastic and said throttle body is plastic.*

*89. The system recited in claim 72 further comprising an EGR assembly located downstream of said throttle valve.*

*90. An air intake system for controlling the flow of air into an internal combustion engine, the air intake system comprising an intake manifold, a throttle body, and an air diffuser, said diffuser having a seal, defining an airflow passage, where at least a plurality of vanes extend only partially into the airflow passage, said vanes surrounded by said seal, said diffuser for reducing noise emanating from the intake system associated with airflow through the intake system, and said seal coupled downstream of the throttle body.*

*91. The system recited in claim 90 wherein a space between at least two of said vanes is about 3.5 mm to 4.5 mm.*

*92. The system recited in claim 91 wherein 11 vanes or less extend only partially into said airflow passage.*

*93. The system recited in claim 91 wherein a first edge of said throttle opens toward said diffuser, and said plurality of vanes that extend only partially into the airflow passage are located to extend from a side of said passage in common with said first edge.*

* * * * *